United States Patent [19]

Palmero et al.

[11] 4,406,958
[45] Sep. 27, 1983

[54] STEPPING MOTORS WITH DISC MAGNET

[75] Inventors: Albert Palmero, Harwinton; Robert N. Brigham, Monroe; Robert S. Lundin, Litchfield, all of Conn.

[73] Assignee: The Superior Electric Company, Bristol, Conn.

[21] Appl. No.: 251,298

[22] Filed: Apr. 6, 1981

Related U.S. Application Data

[63] Continuation-in-part of Ser. No. 62,687, Aug. 1, 1979, abandoned.

[51] Int. Cl.³ .......................................... H02K 21/12
[52] U.S. Cl. ................................. 310/49 R; 310/156

[58] Field of Search ............... 310/156, 49, 162-165

[56] References Cited

U.S. PATENT DOCUMENTS 3,696,260 10/1972 Lace .................................. 310/156
3,956,650 5/1976 Field .................................. 310/156
4,127,802 11/1978 Johnson ......................... 310/156 X Primary Examiner—Donovan F. Duggan

[57] ABSTRACT

The rotor in each of the disclosed stepping motors comprises a permanent magnet disc between toothed pole pieces, the diameter of the magnet disc is essentially equal to the outer diameter of the toothed pole pieces.

14 Claims, 6 Drawing Figures

STEPPING MOTORS WITH DISC MAGNET

This application is a continuation-in-part of application Ser. No. 62,687, filed Aug. 1, 1979, now abandoned.

Stepping motors of a known type have a rotor that includes a permanent magnet positioned between a pair of toothed pole pieces. The magnet has generally been of the high flux density type that prominently includes cobalt in its composition. Such magnets, hereafter conveniently called the "cobalt type", are exemplified by Alnico types I through VI. Another type of permanent magnet material useful in stepping motors, sometimes referred to as "ceramic", is made of ferrite compositions that do not contain cobalt.

Magnetic properties of the ceramic and the cobalt types of permanent-magnet compositions may be judged according to their well-known properties, notably their remanence ($B_R$) and their magnetizing or coercive force ($H_C$). Remanence is the residual flux density in a closed-loop magnetic circuit of zero reluctance after the circuit has been subjected to saturating excitation. Coercive force is the magnetizing force required to reduce the flux density to zero in a closed-loop magnetic circuit after the circuit has been subjected to saturating magnetic excitation. The cobalt type of magnet typically provides a greater remanence than ceramic magnets, perhaps on the order of two to three times that of the ceramic magnets while ceramic magnets have a greater magnetizing or coercive force.

With the increasing cost and scarcity of cobalt, it has become advantageous to employ ceramic permanent magnets instead of cobalt-type magnets. However, as the characteristics of the two types are different, an identical substitution of one for the other in a stepping motor rotor would not provide an equivalent performance of the motor. Mostly, such lack of equivalency is traceable to a reduction in the flux density of the ceramic magnet as compared to the cobalt-type magnet.

Another type of magnet, the rare earth magnet, is composed of ⅛ to ⅝ cobalt. While this type of magnet has less flux density (at a typical stepper-motor load line) than Alnico V magnets, it has about three times the magnetic energy product ($B_R \times H_C$). Therefore, it may be advantageous to use rare earth magnets in stepping motors since a lesser quantity of cobalt is needed in rare earth magnets than in Alnico magnets to yield an equivalent magnetic energy product.

In U.S. Pat. No. RE. 25,445 and U.S. Pat. No. 2,931,929, both assigned to the assignee of the present invention, stepping motors are disclosed having a permanent magnet that is long from pole-to-pole and correspondingly has a pair of cupped peripherally toothed pole pieces that overhang the magnet. That construction requires the high-flux-density cobalt-type magnets. U.S. Pat. No. 3,206,623 (also assigned to the assignee of the present invention) and U.S. Pat. No. 3,751,696 disclose stepping motors having double-magnet rotors which, as shown, also require high-remanence cobalt-type magnets. U.S. Pat. Nos. 3,777,196 and 3,956,650 disclose stepping motors whose rotors have permanent magnets as of ferrite which characteristically have low remanence and high coercivity. Consequently, those magnets are discs, short from pole-to-pole, and they have peripherally toothed, flat-faced pole pieces that do not overhang the magnet. Notably, in all this prior art, the pole pieces have a larger outside diameter than that of the magnet.

It is accordingly an object of the present invention to provide a rotor for a stepping motor of the permanent magnet type in which the magnet material contains little if any cobalt, or which utilizes cobalt more efficiently than in high remanence cobalt-type magnets, yet which attains nearly approximate performance of a rotor having a high remanence cobalt-type magnet.

Another object of the present invention is to achieve the above object with a permanent magnet rotor that has essentially the same axial and radial dimensions as the rotors of heretofore known cobalt-type permanent magnet rotors, for use with the same stators, without alteration, as those used with rotors having cobalt-type magnets.

A further object of the present invention is to achieve the above objects with a rotor which is essentially as economical to manufacture as heretofore known rotors.

In another aspect, an object of the present invention resides in providing stepping motors of improved holding torque and related characteristics, employing magnets of low-remanence and high coercivity instead of magnets of high remanence and low coercivity.

In providing a novel stepping motor embodying features of the invention, the magnet used is formed as a disc. High coercivity material is used, such as a cobalt-free ceramic magnet formed of strontium ferrite or barium ferrite or mixtures thereof or a rare earth magnet having a large percentage of cobalt. The magnet disc is sandwiched between a pair of pole pieces which are also cylindrical but which have toothed peripheries. The outside diameters of the magnet disc and the pole pieces are made essentially the same so that the periphery of the magnet disc extends to the outer periphery of the teeth of the pole pieces. In this construction, a side surface of each tooth from its root to its end engages the magnet disc. There is a complex pattern of fringing flux in the spaces between the teeth. However, by having the outer diameters of the magnet disc and the pole pieces essentially coextensive, Applicants have found that the holding torque for a stepping motor may be increased by 5% or so as compared to an identical motor in which the magnet disc extends just to the roots of the teeth. The holding torque is a figure of merit, so that there is a corresponding increase of torques generally, including the pull-in torque and pull-out torque.

Other features and advantages appear below.

IN THE DRAWING

Figure 1:
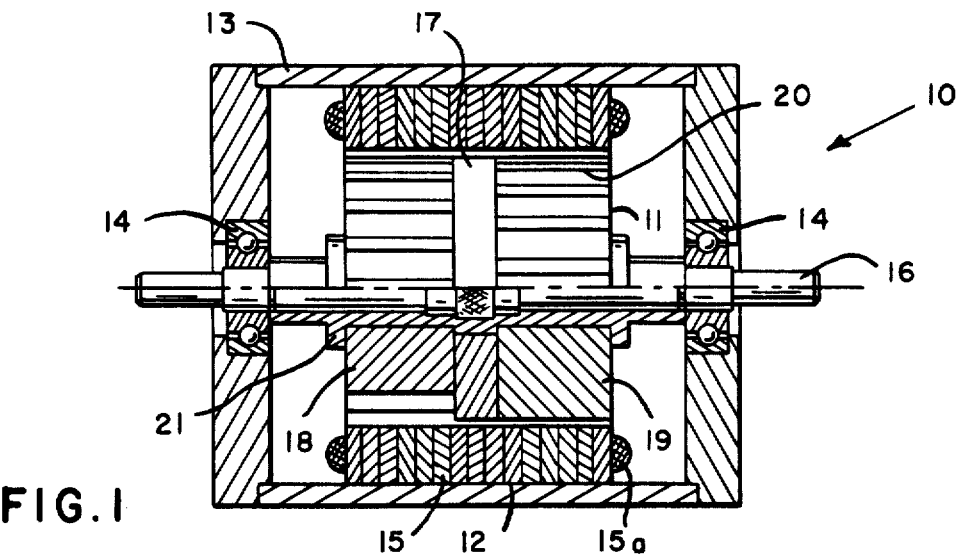
FIG. 1 is a partial axial section of a stepping motor having a rotor made according to the present invention.

Referring to the drawing, a stepping motor of the type disclosed in the above-noted patents is generally indicated by the reference numeral 10 and includes a rotor 11 and a stator 12. The stator is of conventional construction and has a casing 13 in which ball bearings 14 are mounted for supporting the rotor 11. A stator stack 15 formed of laminated iron comprising pole portions that bear windings 15a. Coils of windings 15a are selectively energized to cause stepping operation of the motor.

The stator for the motor of FIG. 1 and for the motors of FIGS. 3-6 is of essentially the same form as those in U.S. Pat. No. RE. 25,445 and U.S. Pat. No. 3,206,623 except that, as an embodiment design change, the present stack of laminations is continuous from end to end. In common with U.S. Pat. No. 3,206,623, there is a solid stack of laminations in the stator opposite each assembly of a magnet and pair of pole pieces of the rotor. The stator comprises inward extending pole members bearing windings 15a. Each pole face is divided into teeth by grooves extending parallel to the motor axis.

The rotor includes a shaft 16 bearing permanent-magnet disc 17 that has a cylindrical outline and is flat and thin. Flat faces of pole pieces 18 and 19 are against the opposite sides of the magnet disc. Each pole piece is formed of low-reluctance magnetic material, such as a relatively high density sintered iron or extruded soft iron. Each pole piece is also shaped as a flat cylinder except that its periphery is divided into axially elongated teeth 20 by grooves parallel to the rotor axis.

The magnet disc 17 is sandwiched between the two pole pieces and the parts are secured on the shaft 16, as by a layer of zinc alloy 21 that is forced between the shaft and the other members by pressure die casting when the parts are clamped together in their desired relationship. Other unifying processes may be used.

The pitch of the stator teeth is uniform and the pitch of the teeth of each pole-piece of the rotor is uniform but, in common with U.S. Pat. No. RE. 25,445, in the present illustrative motors there is a difference between the pitches of the rotor teeth and the stator teeth. In an example, the cylinder in which the inner surfaces of the stator teeth lie is divided into 48-tooth intervals and the periphery of the rotor pole-pieces is divided into 50 teeth. In FIG. 1, each of the stator teeth is aligned from end-to-end, whereas the teeth of each pole-piece are displaced one-half of a tooth pitch from the teeth of the other pole piece at the opposite faces of the magnet.

Figure 2:
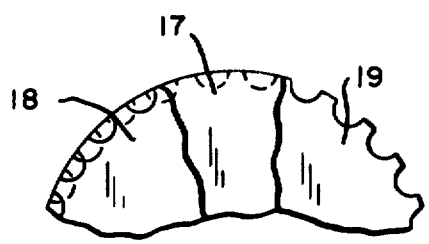
FIG. 2 is a partial end view of the rotor of FIG. 1 with portions broken away.

As shown in FIG. 2, the periphery of the magnet disc is smooth and essentially corresponds to an imaginary cylinder of the outer periphery of the pole pieces as defined by the outer surfaces of the teeth 20, that is, the tooth surfaces opposite the inner surfaces of the stator poles. It is desirable for the diameter of the cylindrical periphery of the magnet disc to be the same as that of the outer tooth surfaces. However, the magnetic disc diameter is made a few thousands of an inch less than the outside diameter of the pole pieces, from outer tooth to outer tooth, in order to facilitate grinding of the pole pieces after assembly onto the shaft without grinding the magnet disc. In this way, extremely hard magnets can be used that do not interfere with grinding of the pole-piece peripheries.

In one example, the pole pieces have a nominal diameter of 2.326 inches and an axial length of 0.525 inch each, and the magnet disc has a nominal diameter of 2.320 inches, by 0.200 inch thick. The axial length of this rotor assembly is 1.25 inches, and the length of the stator is 1.181 inches. In this example, the depth of the teeth from the outer periphery to their root is 0.050 inches (a nominal root diameter of 2.226 inches) and the gap between the radially inner tooth surfaces of the stator and the outer periphery of the rotor teeth is about 0.005 inch. Essentially the same gap is formed between the inner tooth surfaces of the stator and the periphery of the magnet disc. The magnets in this example are of ceramic 8 material as defined by the Magnetics Material Producers Association. Using a motor made of parts as just described, 5% increase in holding torque was attained as compared to an otherwise identical motor whose magnet disc extended only to the root diameter of the rotor teeth.

Figure 3:
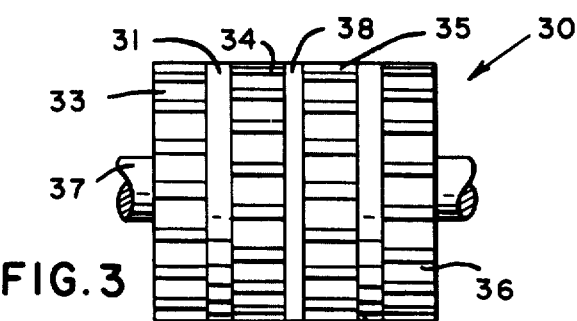
FIG. 3 is a side view of another embodiment of the rotor according to the present invention.

Shown in FIG. 3 is a further embodiment of the present invention in which a rotor 30 includes two magnet discs 31 and 32 and four pole pieces 33, 34, 35 and 36 mounted on a shaft 37. The pole pieces 33 and 34 sandwich the magnet disc 31 while the pole pieces 35 and 36 sandwich the magnet disc 32. Both magnet discs are magnetized in the same axial direction. To separate the magnetic circuits, an aluminum spacer 38 or other high reluctance gap forming device is positioned between the pole piece 34 (an S pole for example) and a pole piece 35 (an N pole). In an example, the rotor parts in FIG. 3 have radial dimensions as in the example given above for FIG. 1, each of the magnet discs has a thickness of 0.200 inch, the spacer is about 0.125 inch thick and each of the four pole pieces is 0.300 inch thick for an overall axial length of the assembly of 1.725 inches. The stator is 1.688 inch long, and the same air gap of 0.005 inch is provided.

Figures 4, 5:
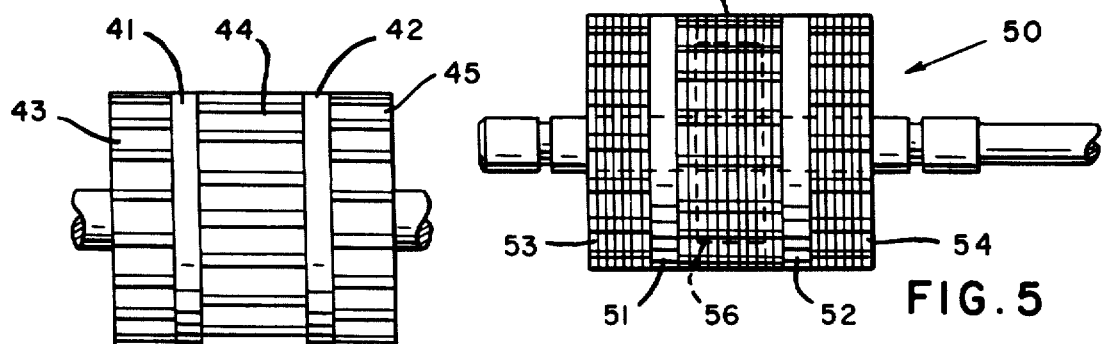
FIG. 4 is a view of still another embodiment of a novel rotor.
FIG. 5 is a view of a novel rotor similar to FIG. 4, in which the pole pieces are laminated, some laminations being hollow.
Figure 6:
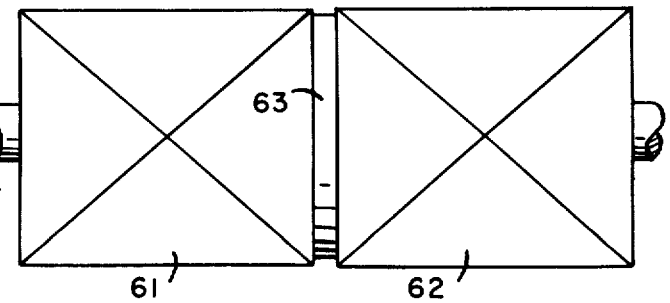
FIG. 6 is a schematic representation of a rotor for a double-magnet rotor.

In the embodiment shown in FIG. 4, the rotor 40 comprises two magnet discs 41 and 42 and three pole pieces 43, 44 and 45. The magnet discs are oppositely magnetized along the motor axis so that the two end pole pieces 43 and 45 are both N poles, for example, while the intermediate pole piece 44 is an S pole. The latter pole piece is advantageously twice as thick as the other two pole pieces. A spacer such as part 38 in FIG. 3 is not needed in the rotor of FIG. 4.

While the above described pole pieces have been indicated as being formed of sintered material, if desired they may be formed of laminated stamped sheet iron that are held together by adhesive, rivets, roll pins, etc., to form a unitary pole piece. As shown in FIG. 5, rotor 50 comprises magnet discs 51 and 52, and pole pieces 53 and 54 and intermediate pole piece 55. Each of the pole pieces is formed as a unitary stack of laminations. In order to decrease the weight of the rotor and hence its inertia, some of the middle laminations in the illustrated motor are formed as ring laminations so that the intermediate pole 55 has a central hollow 56, represented in dotted lines. While FIG. 5 discloses laminations used on a three pole magnet assembly, it will be understood that laminations may be employed in place of sintered pole pieces on the magnet assemblies shown in FIGS. 1, 3 and 4.

The above described embodiments of a rotor are for a modular-length rotor as shown in the above noted U.S. Pat. No. RE. 25,445, U.S. Pat. Nos. 2,931,929, 3,777,196 and 3,956,650. If desired, the axial length of the motor may be increased, even doubled, as disclosed in U.S. Pat. Nos. 3,206,623 and 3,761,969. In that event, a rotor 60 such as that schematically shown in FIG. 6, may be employed. Such a rotor has two magnetic assemblies 61 and 62, each being like any one of the above disclosed rotor assemblies of one or more magnet discs sandwiched between pole pieces. A spacer 63 is used where the adjacent pole pieces of the two assemblies are of opposite polarity as in U.S. Pat. No. 3,206,623, while such spacer may be omitted where the adjacent pole pieces of the two assemblies are of like polarity as in U.S. Pat. No. 3,751,696. In the latter construction, the adjacent pole pieces of the two magnet assemblies may abut each other and they may be formed as a double thickness pole piece.

As shown in FIG. 2, the pole piece 19 is offset one-half a tooth pitch from the pole piece 18, the teeth of the stator poles being aligned throughout their length. It will be understood, however, that the teeth of the pole pieces 18 and 19 may be aligned if the portions of the stator opposite to pole pieces 18 and 19 are mutually displaced by one-half of a stator tooth pitch. In the rotors of FIGS. 3-6, the teeth of the rotor pole pieces at opposite sides of each magnet are correspondingly offset one-half of a rotor tooth pitch where the stator teeth are aligned along the whole axial length of the stator. Moreover, the teeth of the rotor pole pieces may all be aligned provided that the stator is divided into pairs of portions opposite the pole pieces of each magnet in the rotor, where the teeth of each such pair of stator portions are offset one-half of a stator tooth pitch. The 5% improvement in performance above is also applicable to the embodiment shown in FIGS. 3-6.

It will accordingly be understood that there has been disclosed a novel stepping motor and a novel rotor for a stepping motor in which cobalt in the magnet material has been eliminated or it is utilized more efficiently. In the magnets of such rotors, the remanence is low and the coercivity is high compared with Alnico V magnets, for example. The magnets are consequently in the form of discs that are used with pole pieces having flat faces abutting the magnets. The rotor includes at least one magnet assembly that includes a magnet disc and two toothed pole pieces. The periphery of the magnet extends to essentially the outer periphery of the teeth of the pole pieces. Thus, the space between the stator teeth and the periphery of the disc magnet(s) is essentially the same as the air gap between the stator teeth and the toothed pole pieces of the rotor.

It will be recognized that, within the skill of the art, variations and modifications in the foregoing may be made without departing from the spirit and scope of the invention.

What is claimed is:

1. A rotor for a stepping motor comprising an assembly including a pair of pole pieces and an axially magnetized permanent-magnet disc disposed between said pole pieces, said pole pieces having peripheral teeth whose outermost surfaces are disposed in a cylinder, each of said pole pieces including respective sides of said teeth thereof having a respective flat face abutting said permanent-magnet disc, the diameter of the disc being essentially equal to the diameter of said cylinder of the peripheral teeth and significantly greater than the root diameter of said teeth.

2. The invention as defined in claim 1 in which both pole pieces are identical in shape and formed of sintered iron.

3. The invention as defined in claim 1 in which both pole pieces are identical in shape and each consists of a unitary stack of laminations.

4. The invention as defined in claim 1, including a further assembly of a pair of pole pieces and a permanent-magnet disc, all as set forth in claim 1, said permanent-magnet discs of said assemblies being polarized in the same direction, respective pole pieces of said assemblies being adjacent each other, and a spacer disc of high reluctance material between said adjacent pole pieces.

5. The invention as defined in claim 1, including a further assembly of a pair of pole pieces and a permanent-magnet disc, all as set forth in claim 1, the permanent-magnet discs of said assemblies being polarized in mutually opposite directions, and said assemblies having respective pole pieces against each other to constitute a unitary pole piece.

6. The invention as defined in claim 5 in which the unitary pole piece has opposite flat faces abutting said magnet discs, respectively, and in which the spaces between the peripheral teeth of the unitary pole piece form a series of continuous hollows each of which extends from one to the other of said discs.

7. The invention as defined in claim 1 in which the magnet disc is formed of material that is free of cobalt.

8. The invention as defined in claim 1 in which the magnet disc is formed of material that is $\frac{1}{2}$ to $\frac{5}{8}$ cobalt.

9. The invention as defined in claim 5 in which at least the unitary pole piece consists of a single piece of sintered iron.

10. The invention as defined in claim 1, in combination with a stator having pole faces formed with elongated teeth each of which extends all along the length of the stator opposite both of said pole pieces, the teeth of each of said pole pieces being offset one-half of a tooth pitch from the teeth of the other of said pole pieces.

11. The invention as defined in claim 1, including a stator having pole faces formed with teeth separated from the magnet disc by a gap that is essentially the same as the air gap between the stator teeth and the pole pieces of the rotor.

12. The invention as defined in either of claims 4 and 5 including a stator having pole faces formed with teeth separated from the magnet discs by a gap that is essentially the same as the air gap between the stator teeth and the pole pieces of the rotor.

13. The invention as defined in claim 1 in combination with a stator having plural poles distributed about said rotor, each of said poles having a pole face bearing arcuately distributed stator teeth, each of the stator teeth having axially aligned portions opposite the respective pole pieces of the rotor, the teeth of each of said pole pieces of the rotor being off-set one-half of a rotor tooth-pitch from the teeth of the other of said pole pieces of the rotor.

14. The invention as in claim 1, 4 or 5 in combination with a stator having a plurality of mutually spaced-apart poles distributed around said rotor, each of said poles having stator pole faces spaced by an air gap from said rotor, each of said stator pole faces being subdivided into multiple arcuately spaced parallel teeth individually extending along said rotor.

* * * * *